United States Patent
Zhang et al.

(10) Patent No.: US 9,819,564 B2
(45) Date of Patent: Nov. 14, 2017

(54) TERMINAL DEVICE

(71) Applicant: Huawei Technologies Co., Ltd., Shenzhen, Guangdong (CN)

(72) Inventors: Gong Zhang, Shenzhen (CN); Guoxiang Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 630 days.

(21) Appl. No.: 14/249,035

(22) Filed: Apr. 9, 2014

(65) Prior Publication Data
US 2014/0310407 A1    Oct. 16, 2014

(30) Foreign Application Priority Data
Apr. 11, 2013   (CN) .......................... 2013 1 0124549

(51) Int. Cl.
*G06F 1/00*   (2006.01)
*H04L 12/26*  (2006.01)
(Continued)

(52) U.S. Cl.
CPC ...... *H04L 43/0876* (2013.01); *G06F 11/3096* (2013.01); *G06Q 10/1091* (2013.01);
(Continued)

(58) Field of Classification Search
CPC .............. G06Q 10/1091; G06F 1/3293; G06F 11/3096; H04L 43/0876; H04W 52/0274;
(Continued)

(56) References Cited

U.S. PATENT DOCUMENTS 6,631,474 B1 * 10/2003 Cai ..................... G06F 1/3203
                                                   713/300
8,769,313 B2 *  7/2014 Bi ...................... G06F 1/263
                                                   713/300
(Continued)

FOREIGN PATENT DOCUMENTS

CN          1550951 A      12/2004
CN        201853186 U       6/2011
(Continued)

OTHER PUBLICATIONS

Lane et al., "A Survey of Mobile Phone Sensing," IEEE Communications Magazine, pp. 140-150, Institute of Electrical and Electronics Engineers, New York, New York (Sep. 2010).
(Continued)

*Primary Examiner* — Aurel Prifti
(74) *Attorney, Agent, or Firm* — Leydig, Voit & Mayer, Ltd.

(57) ABSTRACT

The present invention provide a terminal device, including: at least one sensor, a data processing unit, a memory, a CPU, and a storage, where the sensor is configured to sense a corresponding measured object and generate corresponding sensing data; and the data processing unit is configured to collect the sensing data jointly with the CPU in a mutually complementary manner, store the collected sensing data in the memory, perform feature extraction on the sensing data stored in the memory, and store extracted feature data in the storage, where the mutually complementary manner refers to that, when one of the data processing unit and the CPU is in a working state, the other is in a dormant state. The terminal device provided by the embodiments of the present invention can improve a utilization rate of the CPU.

15 Claims, 2 Drawing Sheets

(51) Int. Cl.
*G06F 11/30* (2006.01)
*G06Q 10/10* (2012.01)
*H04W 52/02* (2009.01)

(52) U.S. Cl.
CPC .... *H04W 52/0274* (2013.01); *H04M 2250/10* (2013.01); *H04M 2250/12* (2013.01); *Y02B 60/50* (2013.01)

(58) Field of Classification Search
CPC .......... H04M 2250/10; H04M 2250/12; Y02B 60/50
USPC ............. 718/102, 1; 713/300, 320; 702/187, 702/127; 700/12; 382/133; 1/1
See application file for complete search history.

(56) References Cited

U.S. PATENT DOCUMENTS

| | | | | |
|---|---|---|---|---|
| 8,942,459 | B2* | 1/2015 | Kask | G06K 9/00147 382/133 |
| 9,518,828 | B2* | 12/2016 | Meriheina | A63B 24/00 |
| 2005/0132239 | A1* | 6/2005 | Athas | G06F 1/3203 713/300 |
| 2008/0005599 | A1* | 1/2008 | Theocharous | G06F 1/3203 713/300 |
| 2008/0184042 | A1* | 7/2008 | Parks | G06F 1/3203 713/300 |
| 2010/0088532 | A1* | 4/2010 | Pollock | G06F 1/1626 713/324 |
| 2010/0302028 | A1* | 12/2010 | Desai | H04W 52/0258 340/539.3 |
| 2011/0077865 | A1* | 3/2011 | Chen | A61B 5/1117 702/3 |
| 2011/0238379 | A1* | 9/2011 | Misra | G06F 19/3418 702/187 |
| 2012/0011504 | A1* | 1/2012 | Ahmad | G06F 12/08 718/1 |
| 2012/0100895 | A1* | 4/2012 | Priyantha | H04W 52/0293 455/574 |
| 2012/0166132 | A1* | 6/2012 | Blom | G06Q 30/02 702/127 |
| 2012/0254878 | A1* | 10/2012 | Nachman | G06F 9/5094 718/102 |
| 2013/0117769 | A1* | 5/2013 | Sharma | G06F 1/3293 719/328 |
| 2013/0261769 | A1* | 10/2013 | Hong | H04W 52/0277 700/12 |
| 2014/0059365 | A1* | 2/2014 | Heo | G06F 1/3206 713/320 |
| 2014/0149754 | A1* | 5/2014 | Silva | G06F 1/3212 713/300 |
| 2015/0172868 | A1* | 6/2015 | Kang | H04L 67/22 455/456.1 |

FOREIGN PATENT DOCUMENTS

| | | |
|---|---|---|
| CN | 202166980 U | 3/2012 |
| CN | 102670181 A | 9/2012 |
| CN | 102692252 A | 9/2012 |
| CN | 103035112 A | 4/2013 |
| WO | WO 2008020223 A1 | 2/2008 |
| WO | WO 2010141878 A1 | 12/2010 |

OTHER PUBLICATIONS

Mane et al., "Explosive Detection with Mobile Telephony—An attempt towards a safe ambience," Proceedings of 2011 International Conference on Signal Processing, Communication, Computing and Networking Technologies, pp. 187-191, Institute of Electrical and Electronics Engineers, New York, New York (2011).

Rawassizadeh et al., "UbiqLog: a generic mobile phone-based life-log framework," Pers Ubiquit Comput, vol. 17, pp. 621-637, Springer-Verlag, London, United Kingdom (2013).

Kim et al., "SensLoc: Sensing Everyday Places and Paths using Less Energy," Proceedings of the $8^{th}$ ACM Conference on Embedded Networked Sensor Systems, pp. 43-56, Association for Computing Machinery, New York, New York (2010).

Miluzzo et al., "Sensing Meets Mobile Social Networks: The Design, Implementation and Evaluation of the CenceMe Application," Proceedings of the $6^{th}$ ACM Conference on Embedded Network Sensor Systems, pp. 337-350, Association for Computing Machinery, New York, New York (2008).

Laurila et al., "The Mobile Data Challenge: Big Data for Mobile Computing Research," Pervasive Computing (2012).

Priyantha et al., "Little Rock: Enabling Energy Efficient Continuous Sensing on Mobile Phones," IEEE Pervasive Computing, vol. 10, Issue 2, pp. 12-15, Institute of Electrical and Electronics Engineers, New York, New York (Apr. 11, 2011).

Priyantha et al., "Little Rock: Enabling Energy Efficient Continuous Sensing on Mobile Phones," Networked Embedded Computing Group, Microsoft Research Tech Report, Redmond, Washington.

Office Action in corresponding Chinese Patent Application No. 201310124549.7 (dated Nov. 3, 2016).

\* cited by examiner

TERMINAL DEVICE

CROSS-REFERENCE TO RELATED APPLICATION

This application claims priority to Chinese Patent Application No. 201310124549.7, filed on Apr. 11, 2013, which is hereby incorporated by reference in its entirety.

TECHNICAL FIELD

The present invention relate to communications technologies, and in particular, to a terminal device.

BACKGROUND

An intelligent terminal becomes an important tool of communication, entertainment, calculation, and storage in daily life of people, and is an integral part of life. Many sensors are built in an existing intelligent terminal, for example, an acceleration sensor, a gravity sensor, an illumination sensor, and a humidity sensor. In addition, there are also some sensors in a broad sense, for example, a touch screen for sensing an operation of a user, a global positioning system (GPS for short) for collecting a position where the intelligent terminal is located, and a microphone for sensing a voice. In the prior art, data of the sensors on the intelligent terminal is collected, and processing such as data mining, machine learning, and artificial intelligence analysis is performed on the collected data, so as to recognize an activity of the user, analyze a behavior, an interest, a feeling, or a social role of the user, and then provide various services for the user.

In the prior art, collection of the data of the sensors (referred to as sensing data in the following) on the intelligent terminal is implemented by a central processor unit (CPU for short) of the intelligent terminal. If the sensing data needs to be collected when the intelligent terminal is in a dormant state, the CPU of the intelligent terminal needs to be waked; in this case, the CPU is mainly used for collecting the sensing data, and a utilization rate of the CPU is not high, which causes waste of a CPU resource.

SUMMARY

Embodiments of the present invention provide a terminal device, so as to solve a problem that collection of sensing data by a CPU of an intelligent terminal causes a low utilization rate of the CPU.

According to a first aspect, a terminal device is provided and includes: a central processing unit CPU, and a memory, and further includes: at least one sensor, a data processing unit, and a storage, where the at least one sensor is configured to sense a corresponding measured object and generate corresponding sensing data;

the data processing unit is configured to collect, jointly with the CPU in a mutually complementary manner, the sensing data generated by the at least one sensor, store the collected sensing data in the memory, perform feature extraction on the sensing data stored in the memory, and store extracted feature data in the storage, where the mutually complementary manner refers to that, when one of the data processing unit and the CPU is in a working state, the other is in a dormant state, and a state of the data processing unit is restricted by a state of the CPU; and the storage is configured to store the feature data extracted by the data processing unit.

With reference to the first aspect, in a first possible implementation manner of the first aspect, the data processing unit is specifically configured to collect, jointly with the CPU in the mutually complementary manner, the sensing data generated by the at least one sensor, store the collected sensing data in the memory, perform feature extraction on the sensing data stored in the memory, and store the extracted feature data in the storage by using a second input/output I/O channel, where the second I/O channel is independent of a first I/O channel that is used by the CPU to access the storage.

With reference to the first possible implementation manner of the first aspect, in a second possible implementation manner of the first aspect, the data processing unit includes: at least one collecting module, a feature extracting module, and a storage managing module, where each collecting module of the at least one collecting module corresponds to one sensor of the at least one sensor;

the at least one collecting module is configured to: when the CPU is in the dormant state, collect the sensing data that is generated by the sensor corresponding to the at least one collecting module, and store the collected sensing data in the memory;

the feature extracting module is configured to extract the feature data of the sensing data that is stored in the memory, and provide the extracted feature data to the storage managing module; and the storage managing module is configured to store, in the storage according to a preset storage directory, the feature data provided by the feature extracting module.

With reference to the second possible implementation manner of the first aspect, in a third possible implementation manner of the first aspect, the data processing unit further includes: a collection policy control module;

the collection policy control module is configured to generate a collection policy, and provide corresponding control information to the at least one collecting module according to the collection policy; and the at least one collecting module is specifically configured to: when the CPU is in the dormant state, collect, according to the control information provided by the collection policy control module, the sensing data that is generated by the at least one sensor corresponding to the at least one collecting module, and store the collected sensing data in the memory.

With reference to the third possible implementation manner of the first aspect, in a fourth possible implementation manner of the first aspect, the collection policy is a periodic collection policy, and the control information is a periodic collection control instruction;

the at least one collecting module is specifically configured to: when the CPU is in the dormant state, periodically collect, according to the periodic collection control instruction provided by the collection policy control module, the sensing data that is generated by the at least one sensor corresponding to the at least one collecting module, and store the collected sensing data in the memory; or the collection policy is a random collection policy, the control information is a random collection control instruction, and the random collection control instruction includes a random collection function used to determine a random collection time;

the at least one collecting module is specifically configured to: when the CPU is in the dormant state, collect, according to the random collection control instruction provided by the collection policy control module and at a time point that is determined by the random collection function in the random collection control instruction, the sensing data that is generated by the at least one sensor corresponding to the at least one collecting module, and store the collected sensing data in the memory; or the collection policy is a full-day continuous collection policy, and the control information is a continuous collection control instruction; and the at least one collecting module is specifically configured to: when the CPU is in the dormant state, continuously collect, according to the continuous collection control instruction provided by the collection policy control module, the sensing data that is generated by the at least one sensor corresponding to the at least one collecting module, and store the collected sensing data in the memory.

With reference to the second possible implementation manner of the first aspect, or the third possible implementation manner of the first aspect, or the fourth possible implementation manner of the first aspect, in a fifth possible implementation manner of the first aspect, the feature extracting module is specifically configured to perform feature extraction, according to a preset extraction period, on the sensing data stored within the extraction period in the memory, and provide the extracted feature data to the storage managing module.

With reference to the fourth possible implementation manner of the first aspect, in a sixth possible implementation manner of the first aspect, the collection policy control module is further configured to: when the collection policy is the periodic collection policy, obtain the sensing data that is collected within a preset adjustment time by the at least one collecting module, adjust a sampling period corresponding to the periodic collection policy according to the obtained sensing data, and provide the at least one collecting module with the sampling period obtained by adjusting, so that the at least one collecting module continues to collect, according to the sampling period obtained by adjusting, the sensing data that is generated by the at least one sensor corresponding to the at least one collecting module.

With reference to the sixth possible implementation manner of the first aspect, in a seventh possible implementation manner of the first aspect, the collection policy control module is specifically configured to: when the collection policy is the periodic collection policy, obtain the sensing data that is collected within the preset adjustment time by the at least one collecting module, calculate a change rate of the sensing data according to the obtained sensing data, adjust the sampling period according to the change rate, and when a difference between the sampling period obtained by adjusting and the sampling period to be adjusted is greater than a preset difference threshold, provide the at least one collecting module with the sampling period obtained by adjusting, so that the at least one collecting module continues to collect, according to the sampling period obtained by adjusting, the sensing data that is generated by the at least one sensor corresponding to the at least one collecting module.

With reference to the third possible implementation manner of the first aspect, or the fourth possible implementation manner of the first aspect, in an eighth possible implementation manner of the first aspect, the collection policy control module is further configured to: when it is detected that a preset first-type triggering event occurs, send an instruction for starting collection to the at least one collecting module, so that the at least one collecting module starts to collect, according to the instruction for starting collection, the sensing data that is generated by the at least one sensor corresponding to the at least one collecting module, and when it is detected that a preset second-type triggering event occurs, send an instruction for ending collection to the at least one collecting module, so that the at least one collecting module ends collecting, according to the instruction for ending collection, the sensing data that is generated by the at least one sensor corresponding to the at least one collecting module; and the at least one collecting module is specifically configured to: when the CPU is in the dormant state, start to collect, according to the instruction for starting collection provided by the collection policy control module, the sensing data that is generated by the at least one sensor corresponding to the at least one collecting module, end collecting, according to the instruction for ending collection provided by the collection policy control module, the sensing data that is generated by the at least one sensor corresponding to the at least one collecting module, and store the collected sensing data in the memory.

With reference to the second possible implementation manner of the first aspect, in a ninth possible implementation manner of the first aspect, the storage managing module is specifically configured to store, in the storage according to a two-level directory, the feature data provided by the feature extracting module, where a first-level directory in the two-level directory is formed by identification information of the terminal device, and a second-level directory in the two-level directory is formed by time information that stores the feature data.

In a terminal device provided by the embodiment of the present invention, a data processing unit is added, and the data processing unit collects, jointly with a CPU in a mutually complementary manner, sensing data generated by a sensor, performs feature extraction on the collected sensing data, and then stores extracted feature data in a storage, so that when the CPU is in a dormant state, operations of collecting and processing the sensing data that is generated by each sensor on the terminal device may be performed by the data processing unit; in this way, even if the sensing data needs to be collected when the terminal device is in the dormant state, the CPU does not need to be waked, facilitating full use of the CPU, and facilitating improvement of a utilization rate of the CPU.

BRIEF DESCRIPTION OF DRAWINGS

To describe the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DESCRIPTION OF EMBODIMENTS

In order to make the objectives, technical solutions, and advantages of embodiments of the present invention more comprehensible, the technical solutions according to the embodiments of the present invention are clearly described in the following with reference to the accompanying drawings of the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
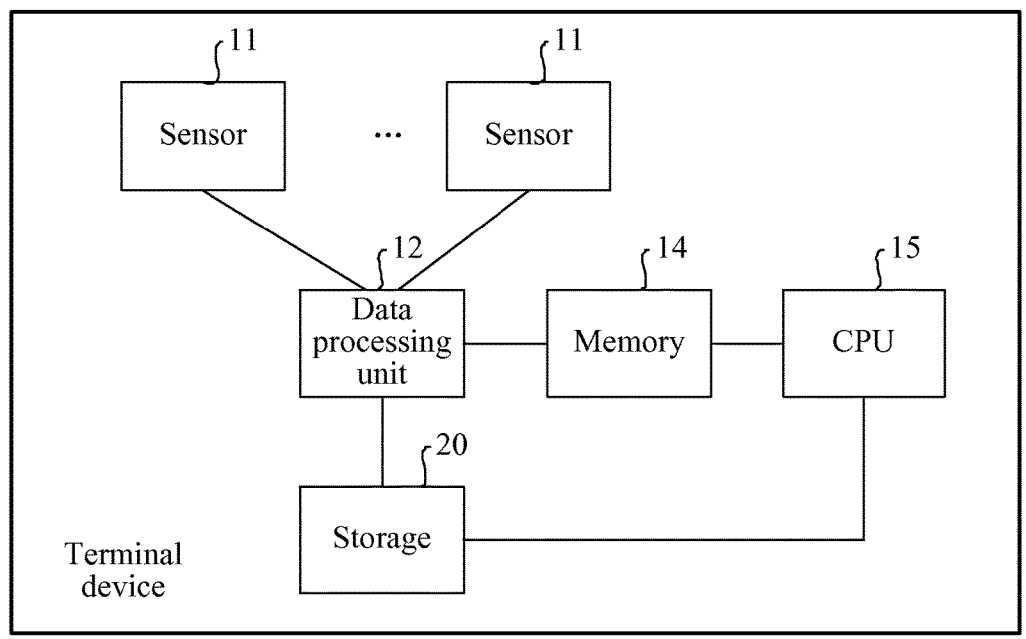
FIG. 1 is a schematic structural diagram of a terminal device according to an embodiment of the present invention.

FIG. 1 is a schematic structural diagram of a terminal device according to an embodiment of the present invention. As shown in FIG. 1, the terminal device in this embodiment includes: a CPU 15 and a memory 14. Further, the terminal device in this embodiment further includes: at least one sensor 11, a data processing unit 12, and a storage 20.

The terminal device in this embodiment includes the at least one sensor 11, and the at least one sensor 11 is configured to sense a corresponding measured object and generate corresponding sensing data. A format and content of sensing data generated by different sensors 11 are different. The sensor 11 in this embodiment not only includes a sensor in a narrow sense, for example, an acceleration sensor, a humidity sensor, a gravity sensor, or a magnetic field sensor, but also includes a sensor in a broad sense, for example, a touch screen for sensing an operation of a user, a GPS for collecting an address and a position where an intelligent terminal is located, or a microphone for sensing a voice.

The data processing unit 12 can work independent of the CPU 15, with a data processing capability of the data processing unit 12 being far less than a data processing capability of the CPU 15, and may be a chip that is independent of the CPU 15. "Independent" described herein mainly refers to that when the CPU 15 is in a dormant state, the data processing unit 12 can replace the CPU 15 to collect and process the sensing data generated by the sensors 11 on the terminal device. The data processing unit 12 is mainly configured to collect, jointly with the CPU 15 in a mutually complementary manner, the sensing data generated by each sensor 11 on the terminal device, store the collected sensing data in the memory 14, perform feature extraction on the sensing data stored in the memory 14, and store extracted feature data in the storage 20. In this embodiment, the mutually complementary manner refers to that, when one of the data processing unit 12 and the CPU 15 is in a working state, the other is in the dormant state, and a state of the data processing unit 12 is restricted by a state of the CPU 15; in other words, if the CPU 15 is in the dormant state, the data processing unit 12 is in the working state, and if the CPU 15 is in the working state, the data processing unit 12 is in the dormant state.

The data processing unit 12 is connected to the memory 14, the sensor 11, and the storage 20.

The storage 20 is configured to store the feature data extracted by the data processing unit 12. Optionally, the storage 20 also allows the data processing unit 12, the CPU 15, or another device to perform an access operation on the stored feature data.

In this embodiment, the memory 14 is mainly configured to store the sensing data collected by the data processing unit 12, to which it is not limited.

In this embodiment, communication can be performed between the storage 20 and the data processing unit 12 by using an input/output (I/O for short) channel.

In an optional implementation manner, the data processing unit 12 and the CPU 15 may share the storage 20, that is, both the data processing unit 12 and the CPU 15 may perform an access operation on the same storage 20. Optionally, in order to reduce impact on access of the CPU 15 to the storage 20, the data processing unit 12 may use an independent I/O channel, namely, a second I/O channel to access the storage 20. The second I/O channel is independent of the first I/O channel that is used by the CPU 15 to access the storage 20.

In another optional implementation manner, the data processing unit 12 may use a storage that is independent of the CPU 15. Based on this, the storage 20 in this embodiment may include a first storage and a second storage. The data processing unit 12 can perform data access only on the second storage. However, the CPU 15 may not only perform data access on the first storage, but also perform data access on the second storage. The data processing unit 12 may perform an access operation on the second storage by using an I/O interface between the data processing unit 12 and the second storage; and the CPU 15 may perform an access operation on the first storage and the second storage by using an I/O interface between the CPU 15 and the first storage and an I/O interface between the CPU 15 and the second storage, respectively. The I/O interface between the second storage and the data processing unit 12 is independent of the I/O interface between the CPU 15 and the first storage and the I/O interface between the CPU 15 and the second storage. In this implementation manner, an access speed supported by the first storage is different from an access speed supported by the second storage, which is not limited by the embodiments of the present invention.

In this embodiment, the CPU 15 is mainly configured to perform another operation other than processing such as collecting the sensing data and performing feature extraction on the sensing data. In a process of performing the another operation, the CPU 15 may use the memory 14 to temporarily store relevant data, and may store, in the storage 20, relevant data that needs to be stored for a long term. The storage 20 may further be configured to store various data provided by the CPU 15, and allow the CPU 15 or the another device to perform an access operation on the stored data.

Optionally, the CPU 15 can work with the memory 14 and the storage 20 to implement another function of the terminal device. Optionally, support related to processing, such as collecting the sensing data and performing feature extraction on the sensing data, may also be provided to the data processing unit 12.

In a terminal device of this embodiment, an data processing unit independent of a CPU is added, and the data processing unit collects, jointly with the CPU in a mutually complementary manner, sensing data generated by each sensor on the terminal device, performs feature extraction processing on the collected sensing data, and stores the extracted feature data in a storage, so as to implement collection and processing of the sensing data, so that when the CPU is in a dormant state, operations of collecting and processing the sensing data may be implemented by the data processing unit; in this way, even if the sensing data needs to be collected and processed when the terminal device is in the dormant state, the CPU does not need to be waked, and the collection and processing of the sensing data can be completed by the data processing unit, facilitating full use of the CPU, facilitating improvement of a utilization rate of the CPU, and reducing waste of a CPU resource.

Figure 2:
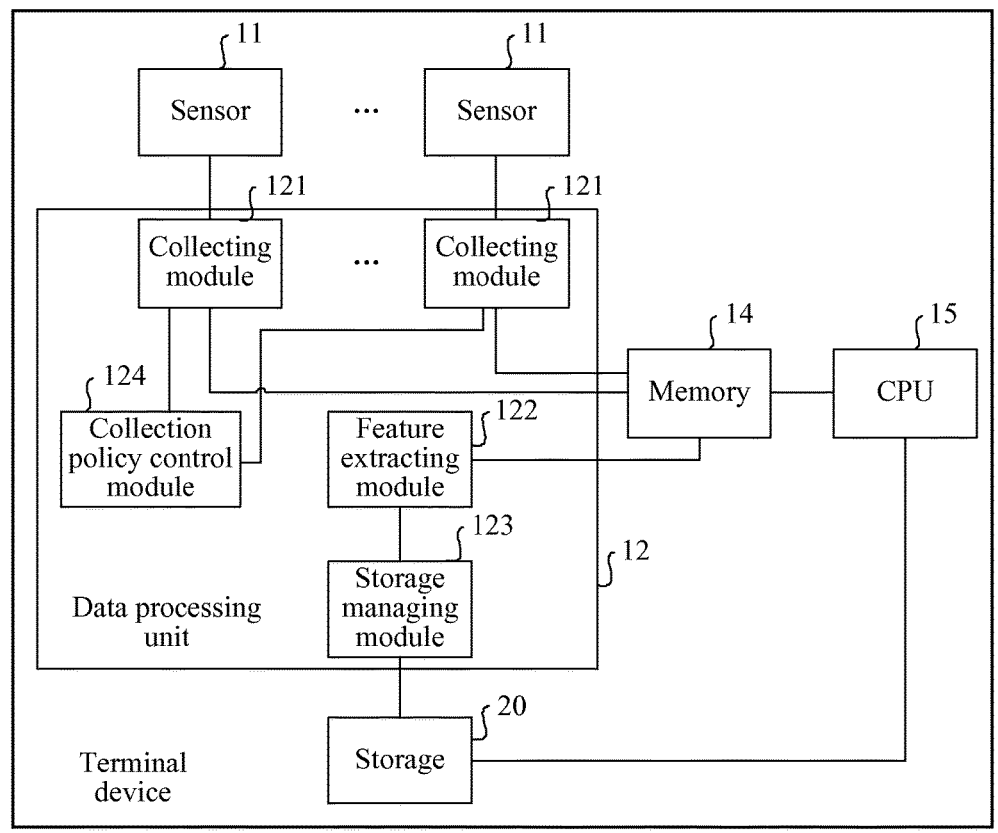
FIG. 2 is a schematic structural diagram of another terminal device according to an embodiment of the present invention.

FIG. 2 is a schematic structural diagram of another terminal device according to an embodiment of the present invention. This embodiment can be implemented based on the embodiment shown in FIG. 1. As shown in FIG. 2, the terminal device in this embodiment includes: at least one sensor 11, a data processing unit 12, a memory 14, a CPU 15, and a storage 20.

The data processing unit 12 includes: at least one collecting module 121, a feature extracting module 122, and a storage managing module 123, where each collecting module 121 of the at least one collecting module 121 corresponds to one sensor 11 of the at least one sensor 11, that is, one collecting module 121 is responsible for collecting sensing data generated by one sensor 11.

The at least one collecting module 121 is configured to: when the CPU 15 is in a dormant state, collect the sensing data that is generated by the at least one sensor 11 corresponding to the at least one collecting module 121, and store the collected sensing data in the memory 14. The feature extracting module 122 is connected to the memory 14 and the storage managing module 123, and is configured to extract the feature data of the sensing data stored by the collecting module 121 in the memory 14, and provide the extracted feature data to the storage managing module 123. The storage managing module 123 is connected to the storage 20, and is configured to store, in the storage 20 according to a preset storage directory, the feature data provided by the feature extracting module 122.

For the sensing data, an operation such as addition, deletion, or modification is generally not involved; and therefore the storage 20 in this embodiment may be implemented by using a relatively simple storage device, which, for example, may be a secure digital (Secure Digital, SD for short) card. A storage speed supported by the SD card is high, thereby leading to a relatively high efficiency for storing the feature data.

Generally, the feature data stored in the storage 20 needs to be uploaded to a server. In order to facilitate differentiation and management of the feature data on a server side, the storage managing module 123 may perform storage management on the feature data in a two-level directory management manner. A first-level directory in the two-level directory may be formed by identification information of the terminal device, and in this way the server can differentiate, by using the first-level directory, which terminal device the feature data comes from. For example, if the terminal device is a smartphone, the identification information of the terminal device may be an international mobile equipment identity (International Mobile Equipment Identity, IMEI for short) of a mobile phone. A second-level directory in the two-level directory may be formed by time information of the stored feature data, and in this way the server can differentiate, by using the second-level directory, of which time the feature data is, for example, the time information may be a time stamp (Time stamp). For example, if the terminal device is a smartphone, the identification information of the terminal device is the IMEI of the smartphone, and the time information of the two-level directory is the time stamp, the storage managing module 123 may name a folder for storing the feature data as Time stamp-IMEI; in this way the feature data stored in the storage 20 is much clear, and after the feature data is uploaded to the server, the server manages the feature data very conveniently.

Generally, different types of the sensors are built in different terminal devices. For example, some terminal devices have built-in gyroscope sensors, while some terminal devices do not have built-in gyroscope sensors. In addition, collection methods supported by, collection interfaces provided by, and collection frequencies supported by the sensors that are built in different terminal devices are different. Using an acceleration sensor built in a terminal device as an example, as shown in Table 1, the sensor supports 4 collection frequencies in a unit of hertz (HZ).

TABLE 1

| Collection Mode | User Interface (User Interface, UI for short) Mode | Normal (Normal) Mode | Game (Game) Mode | Fast (Fast) Mode |
|---|---|---|---|---|
| Supported collection frequency | 10-15 Hz | 5 Hz | 40 Hz-50 Hz | Greater than 50 Hz |

The collecting module 121 provided by this embodiment adapts to the sensor 11 corresponding to the collecting module 121, and can also support different collection methods, support different collection interfaces, and support different collection frequencies. If it is intended to recognize an activity of the user by using the sensing data generated by the acceleration sensor, a high collection frequency may be preferably used, for example, generally a collection frequency greater than 20 Hz may be used.

The sensors 11 that can be built in the terminal device in this embodiment are shown in Table 2, but are not limited to the sensors shown in Table 2. Correspondingly, the content and/or the format of the sensing data collected by the collecting module 121 are also shown in Table 2.

TABLE 2

| Type of Sensor | Sensing Data |
|---|---|
| Acceleration sensor | <time stamp, x, y, z> |
| Magnetic field sensor | <time stamp, x, y, z> |
| Direction sensor | <time stamp, x, y, z> |
| Gyroscope sensor | <x, y, z> |
| Distance sensor | <time stamp, proximity-value (Proximity-value)> |
| Illumination sensor | <time stamp, light-value (Light-value)> |
| GPS | <time stamp, longitude, latitude, elevation, speed> |
| WiFi sensor | <time stamp, a medium access control (Medium Access Control, MAC for short) address and signal strength of a sensed WiFi device> |
| Microphone | Audio file named as time |
| Image recognizing module | Picture file named as time, and the format may be JPEG, and so on |
| Battery detecting module | <time stamp, being charged or not, voltage, temperature, and so on> |
| Base station detecting module | <time stamp, identifier (ID) of a base station, signal strength, and so on> |
| User operation log recording module | Recorded call log, short message log, application usage log, log of turning on and turning off a screen, network connection log, and so on |
| Another module | . . . |

It can be seen from the foregoing that a plurality of sensors may be built in the terminal device in this embodiment, and with development of the terminal device and an application based on the terminal device, the number of the sensors built in the terminal device is increasingly larger, and the collection frequency is also relatively high. The terminal device is generally powered by a battery, and the battery power is limited. Daily applications of the terminal device, for example, accessing to the Internet to browse a web page, playing a game, receiving or sending a short message, and making a phone call, consume the battery power; if the sensing data generated by numerous sensors is collected in real time, the battery power of the terminal device will be quickly exhausted. Therefore, this embodiment provides a terminal device, so as to save the battery power of the terminal device.

As shown in FIG. 2, the data processing unit 121 in this embodiment further includes: a collection policy control module 124.

The collection policy control module 124 is connected to the at least one collecting module 121, and is configured to generate a collection policy, and provide corresponding control information to the at least one collecting module 121 according to the collection policy. If the collection policy is different, the control information corresponding to the collection policy is also different. For example, if the collection policy is a periodic collection policy, the control information corresponding to the collection policy may be a periodic collection control instruction, and the periodic collection control instruction carries a sampling period; if the collection policy is a random collection policy, the control information corresponding to the collection policy may be a random collection control instruction, and the random collection control instruction includes a random collection function used to determine a random collection time; if the collection policy is a full-day continuous collection policy, the control information corresponding to the collection policy may be a continuous collection control instruction, which is used to instruct full-day continuous collection to be performed; and so on.

Based on the collection policy control module 124, the at least one collecting module 121 may be specifically configured to: when the CPU 15 is in the dormant state, collect, according to the control information provided by the collection policy control module 124, the sensing data generated by the at least one sensor 11 corresponding to the at least one collecting module 121, and store the collected sensing data in the memory 14. The collecting module 121 performs collection according to a certain collection policy, facilitating reduction of the power that is consumed by sensing data collection.

If the collection policy is a periodic collection policy, the control information is a periodic collection control instruction, and the at least one collecting module 121 may be specifically configured to: when the CPU 15 is in the dormant state, periodically collect, according to the periodic collection control instruction provided by the collection policy control module 124, the sensing data generated by the at least one sensor 11 corresponding to the at least one collecting module 121, and store the collected sensing data in the memory 14.

If the collection policy is a random collection policy, the control information corresponding to the collection policy may be a random collection control instruction, and the at least one collecting module 121 may be specifically configured to collect, according to the random collection control instruction provided by the collection policy control module 124 and at a time point that is determined by the random collection function in the random collection control instruction, the sensing data that is generated by the at least one sensor 11 corresponding to the at least one collecting module 121, and store the collected sensing data in the memory 14.

If the collection policy is a full-day continuous collection policy, the control information corresponding to the collection policy may be a continuous collection control instruction, and the at least one collecting module 121 may be specifically configured to: when the CPU 15 is in the dormant state, continuously collect, according to the continuous collection control instruction provided by the collection policy control module 124, the sensing data generated by the at least one sensor 11 corresponding to the at least one collecting module 121, and store the collected sensing data in the memory 14.

In user behavior mining, the most ideal collection policy is the full-day continuous collection policy; that is, the sensing data generated by the sensor is continuously collected for 24 hours a day. The sensing data obtained in this way is most abundant, and is most conducive to user behavior modeling and data mining, but a large amount of battery power will be consumed. It is proved by an experiment that: when sensing data generated by an acceleration sensor is continuously collected all day long, 200 K of sensing data is generated and 1% of the power is consumed every minute on average, and the battery power of the terminal device lasts for less than two hours. Based on this, the full-day continuous collection policy may be applied to a scenario where a large amount of sensing data is required.

For a scenario where a large amount of sensing data is not required, the periodic collection policy or the random collection policy may be used.

The periodic collection policy refers to that the sensing data generated by the sensor is collected once at a fixed interval. The time interval for each collection is not limited. For example, the collection may last for 1 minute every 6 minutes, or last for 1 minute every 5 minutes. The collection policy control module 124 may be specifically configured to generate the periodic collection policy, and provide, by using the periodic collection control instruction, the sampling period used by the periodic collection policy to each collecting module 121.

Specifically, if a change of the sensing data generated by the sensor is small, it indicates that a current activity of the terminal device is relatively steady, for example, the terminal device may be placed on a fixed object (for example, a desk); in this case, only a small amount of sensing data is required for processing such as data mining, machine learning, and artificial intelligence analysis, and a sampling frequency for the sensing data may be reduced. If the change of the sensing data generated by the sensor is large, it indicates that the current activity of the terminal device is frequent or intense, for example, the user who carries the terminal device may be jogging, doing shopping, or in a moving vehicle; in this case, more sensing data is required for processing such as data mining, the machine learning, and artificial intelligence analysis, the sampling frequency for the sensing data may be increased. A smaller change of the sensing data indicates a lower sampling frequency; and a larger change of the sensing data indicates a higher sampling frequency. Based on this, the collection policy control module 124 may be further configured to: when the collection policy is the periodic collection policy, obtain the sensing data that is collected within a preset adjustment time by the at least one collecting module 121, adjust the sampling period corresponding to the periodic collection policy according to the obtained sensing data, and provide the at least one collecting module 121 with the sampling period obtained by adjusting, so that the at least one collecting module 121 continues to collect, according to the sampling period obtained by adjusting, the sensing data that is generated by the at least one sensor 11 corresponding to the at least one collecting module 121.

Further, the collection policy control module 124 may be further configured to: when the collection policy is the periodic collection policy, obtain the sensing data that is collected within the preset adjustment time by the at least one collecting module 121, calculate a change rate of the sensing data according to the obtained sensing data, adjust the sampling period according to the change rate, and when a difference between the sampling period obtained by adjusting and the sampling period to be adjusted is greater than a preset difference threshold, provide the at least one collecting module 121 with the sampling period obtained by adjusting, so that the at least one collecting module 121 continues to collect, according to the sampling period obtained by adjusting, the sensing data that is generated by the at least one sensor 11 corresponding to the at least one collecting module 121. For example, the collection policy control module 124 may preset the adjustment time, and the adjustment time may be implemented by using a sliding time window; the collecting module 121 collects the sensing data generated by the sensor; each time after the collection time of the collecting module 121 exceeds the sliding time window, the sampling policy control module 124 calculates the change rate of the sensing data once according to the sensing data collected by the collecting module 121 in the sliding time window. The change rate may be a function of a variance of the sensing data, and is recorded as g(var), where var is the variance. Then, the sampling policy control module 124 can recalculate a new sampling rate by using a sampling rate function f, where the sampling rate function f is a function of the change rate and is recorded as f[g(var)], and then obtain a new sampling period (that is, the sampling period obtained by adjusting). Then, the sampling policy control module 124 obtains the difference between the sampling period obtained by adjusting and the sampling period to be adjusted, and determines whether the difference is greater than the preset difference threshold. If a determination result is that the difference is greater than the preset difference threshold, the sampling policy control module 124 provides the sampling period obtained by adjusting to the collecting module 121, so that the collecting module 121 continues to collect the sensing data generated by the corresponding sensor 11 according to the sampling period obtained by adjusting.

The random collection policy refers to that the sensing data generated by the sensor is collected in an undetermined time segment on a day. Activities of human beings on a day have a similarity and a rule, for example, from 0 o'clock to 6 o'clock in the early morning, most people are in a sleeping state within this time segment; and from 9 o'clock to 11 o'clock A.M., most people are in a working state. According to the rule of the activities of human beings, a day may be divided into multiple time segments. Table 3 shows a manner of dividing a whole day into time segments.

TABLE 3

| Time segment 1 | Sleep | 0:00-6:00 |
| Time segment 2 | Early morning | 6:00-9:00 |
| Time segment 3 | Forenoon | 9:00-11:30 |
| Time segment 4 | Noon | 11:30-13:30 |
| Time segment 5 | Afternoon | 13:30-17:00 |
| Time segment 6 | Nightfall | 17:00-19:00 |
| Time segment 7 | Evening | 19:00-21:00 |
| Time segment 8 | To go to sleep | 21:00-24:00 |

If the user is in a different activity state, a frequency required for collecting the sensing data is different. Generally, when the activity is frequent, a required collection frequency is high; when the activity is single and relatively steady, a required collection frequency is low. If the sensing data can be collected according to the activity state of the user, the required sensing data can not only be obtained, energy consumption can also be reduced. Based on this, the collection time on each day may be determined by using the random collection function, and then the sensing data is collected within the collection time. Based on this, the collection policy control module 124 may be specifically configured to generate the random collection policy, and provide the random collection function to the collecting module 121, so that the collecting module 121 determines the collection time according to the random collection function, and collects the sensing data within the determined collection time. This random collection manner can disperse the time segments for collecting the sensing data, facilitating reduction of the power consumed for collecting the sensing data.

Optionally, a manner that the collection policy control module 124 generates the collection policy may be provided, for the collection policy control module 124, by the user through a man-machine interface provided by the terminal device.

It can be seen from the foregoing that the terminal device in this embodiment performs periodic collection or random collection by using the collection policy control module 124 that controls the collecting module 121, facilitating saving of the battery power consumed for collecting the sensing data.

Further, the collection policy control module 124 may be further configured to: when it is detected that a preset first-type triggering event occurs, send an instruction for starting collection to the at least one collecting module 121, so that the at least one collecting module 121 starts to collect, according to the instruction for starting collection, the sensing data that is generated by the at least one sensor 11 corresponding to the at least one collecting module 121, and when it is detected that a preset second-type triggering event occurs, send an instruction for ending collection to the at least one collecting module 121, so that the at least one collecting module 121 ends collecting, according to the instruction for ending collection, the sensing data that is generated by the at least one sensor 11 corresponding to the at least one collecting module 121.

Based on this, the at least one collecting module 121 is specifically configured to: when the CPU 15 is in the dormant state, start to collect, according to the instruction for starting collection provided by the collection policy control module 124, the sensing data that is generated by the at least one sensor 11 corresponding to the at least one collecting module 121, end collecting, according to the instruction for ending collection provided by the collection policy control module 124, the sensing data that is generated by the at least one sensor 11 corresponding to the at least one collecting module 121, and store the collected sensing data in the memory 14.

Specifically, the collection policy control module 124 may analyze the sensing data collected by the corresponding collecting module 121, so as to determine whether the preset first-type triggering event or second-type triggering event occurs.

Optionally, the first-type triggering event includes but is not limited to: a network connection event, a call event (an incoming call or an outgoing call), a battery charging event, an application operation event, a terminal device movement event, a terminal device acceleration event, and so on.

Optionally, the second-type triggering event includes but is not limited to: an event of power being excessively low, an event of the terminal device being static, and so on.

The terminal device in this embodiment detects a relevant triggering event by using the collection policy control module 124, and controls, according to the triggering event, the collecting module 121 to perform collection or end collection, so that the collecting module 121 may collect the sensing data when necessary and may not collect the sensing data when unnecessary, facilitating further saving of the battery power.

Further, the feature extracting module 122 in the terminal device in this embodiment may be specifically configured to perform feature extraction, according to a preset extraction period, on the sensing data stored within the extraction period in the memory 14, and provide the extracted feature data to the storage managing module 123, so that the storage managing module 123 stores the feature data in the storage 20 according to the preset storage directory. For example, an extraction period may be preset, and the extraction period may be implemented by using a sliding time window; for example, the length of the sliding time window is 5 seconds, which means that feature extraction is performed every 5 seconds on the sensing data that is collected and stored in the memory 14 by the collecting module 121 within the 5 seconds; in this way, the number of feature extraction times may be reduced, facilitating reduction of the amount of extracted feature data.

A process for the feature extracting module 122 to perform feature extraction is described by using an acceleration sensor as an example. Specifically, sensing data that is generated by the acceleration sensor provided by the collecting module 121 has three components: an x component, a y component, and a z component. A component s may be calculated by using these three components, and s=Math·Sqrt(x*x+y*y+z*z). For these four components, 8 features can be calculated each and a total of 32 features are obtained. Math·Sqrt indicates a function for computing a square root. The 8 features are respectively a mean value, a variance, a mean absolute value, energy, the maximum value, the minimum value, a fast Fourier transformation (Fast Fourier Transformation, FFT for short) mean value, and an FFT weighted mean.

The energy=ΣMath·pow(x, 2)/n, where n indicates the number of pieces of sensing data collected by the collecting module 121 within the extraction period, which may be briefly referred to as the number of sampling points. The FFT mean value refers to a mean value after FFT transformation is performed on the sensing data collected by the collecting module 121 within the extraction period. The FFT weighted mean refers to a weighted mean value after the FFT transformation is performed on the sensing data collected by the collecting module 121 within the extraction period; weighted values are respectively 1/n, 2/n, . . . , i/n, . . . , and n/n. For the x component, the following several features are included: the mean value, the variance, the mean absolute value, the maximum value, and the minimum value; for the y component, the following several features are included: the mean value, the variance, the mean absolute value, the maximum value, and the minimum value; for the z component, the following several features are included: the mean value, the variance, the mean absolute value, the maximum value, and the minimum value.

The feature extracting module 122 in this embodiment periodically performs feature extraction; therefore, data amount is reduced, a plurality of threads may not need to be used, and feature extraction may be implemented by using a single thread, facilitating further reduction of the battery power that is consumed.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium may include any medium capable of storing program code, such as a ROM, a RAM, a magnetic disk, or an optical disc.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof. Such modifications or replacements do not cause the essence of corresponding technical solutions to depart from the scope of the technical solutions of the embodiments of the present invention.

What is claimed is:

1. A terminal device comprising:
a central processing unit (CPU) and a memory;
at least one sensor configured to sense a measured object and generate sensing data, a chip of which has a data processing capability that is far less than a data processing capability of the CPU, and a storage;
the chip is configured to
(a) collect, jointly with the CPU in a mutually complementary manner, the sensing data generated by the at least one sensor,
(b) store the collected sensing data in the memory,
(c) perform feature extraction on the sensing data stored in the memory by
i. determining a s component using x, y, and z spatial components by the following equation: s=Math·Sqrt (x*x+y*y+z*z), wherein Math·Sqrt is a function for computing a square root;
ii. determining eight features for each of the x, y and z components and the component s to obtain 32 features, wherein the eight features are (1) a mean value, (2) a variance, (3) a mean absolute value, (4) energy=ΣMath·pow(x, 2)/n, where n is a number of pieces of sensing data collected within an extraction period, (5) a maximum value, (6) a minimum value, (7) a fast Fourier transformation (FFT) mean value, which is a mean value after FFT is performed on the sensing data, and (8) an FFT weighted mean that is a weighted mean value after the FFT is performed on the sensing data and the weighted values are 1/n, 2/n, . . . , i/n, . . . and n/n; and
(d) store extracted feature data in the storage,
wherein the mutually complementary manner refers to that, when one of the chip and the CPU is in a working state, the other is in a dormant state, and a state of the chip is restricted by a state of the CPU; and
the storage is configured to store the feature data extracted by the chip.

2. The terminal device according to claim 1, wherein, to store extracted feature data in the storage, the chip is configured to store the extracted feature data in the storage using a second input/output (I/O) channel, wherein the second I/O channel is independent of a first I/O channel that is used by the CPU to access the storage.

3. The terminal device according to claim 1, wherein the chip is configured to store the extracted feature data in the storage according to a preset storage directory.

4. The terminal device according to claim 3, wherein the chip is configured to generate a collection policy and control information corresponding to the collection policy and to collect, when the CPU is in the dormant state, the sensing data that is generated by the at least one sensor according to the control information.

5. The terminal device according to claim 4, wherein the collection policy is a periodic collection policy, and the control information is a periodic collection control instruction;
to collect the sensing data, the chip is configured to: when the CPU is in the dormant state, periodically collect, according to the periodic collection control instruction, the sensing data that is generated by the at least one sensor.

6. The terminal device according to claim 1, wherein, to perform feature extraction on the sensing data stored in the memory, the chip is configured to perform the feature extraction, according to a preset extraction period, on the sensing data stored within the extraction period in the memory.

7. The terminal device according to claim 5, wherein the chip is further configured to: when the collection policy is the periodic collection policy, obtain the sensing data that is collected within a preset adjustment time, adjust a sampling period corresponding to the periodic collection policy according to the obtained sensing data to obtain an adjusted sampling period, and continues to collect, according to the adjusted sampling period, the sensing data that is generated by the at least one sensor.

8. The terminal device according to claim 5, wherein, to collect the sensing data, the chip is configured to: when the collection policy is the periodic collection policy, obtain the sensing data that is collected within the preset adjustment time, calculate a change rate of the sensing data according to the obtained sensing data, adjust the sampling period according to the change rate to obtain an adjusted sampling period, and when a difference between the adjusted sampling period and the sampling period before adjusting is greater than a preset difference threshold, continues to collect, according to the adjusted sampling period, the sensing data that is generated by the at least one sensor.

9. The terminal device according to claim 4, wherein the chip is further configured to: when it is detected that a preset first-type triggering event occurs, start to collect the sensing data that is generated by the at least one sensor, and when it is detected that a preset second-type triggering event occurs, end collecting the sensing data that is generated by the at least one sensor; and
to collect the sensing data, the chip is configured to: when the CPU is in the dormant state, start to collect, according to the instruction for starting collection, the sensing data that is generated by the at least one sensor, end collecting, according to the instruction for ending collection, the sensing data that is generated by the at least one sensor, and store the collected sensing data in the memory.

10. The terminal device according to claim 3, wherein, to store extracted feature data in the storage, the chip is configured to store, in the storage according to a two-level directory, the feature data provided by the chip, wherein a first-level directory in the two-level directory is formed by identification information of the terminal device, and a second-level directory in the two-level directory is formed by time information that stores the feature data.

11. The terminal device according to claim 4, wherein the collection policy is a random collection policy, the control information is a random collection control instruction, and the random collection control instruction comprises a random collection function used to determine a random collection time;
to collect the sensing data, the chip is configured to: when the CPU is in the dormant state, collect, according to the random collection control instruction and at a time point that is determined by the random collection function in the random collection control instruction, the sensing data that is generated by the at least one sensor.

12. The terminal device according to claim 4, wherein the collection policy is a full-day continuous collection policy, and the control information is a continuous collection control instruction; and
to collect the sensing data, the chip is configured to: when the CPU is in the dormant state, continuously collect, according to the continuous collection control instruction, the sensing data that is generated by the at least one sensor.

13. The terminal device according to claim 1, wherein the at least one sensor comprises an acceleration sensor and the sensing data comprises the x, y, and z spatial components.

14. A method comprising:
sensing and collecting, by a chip and a central processing unit (CPU), a measured object and generate sensing data,
storing the collected sensing data in a memory,
extracting, by the chip and the CPU, feature data from the stored sensing data by calculating a s component using x, y, and z spatial components by the following equation: s=Math·Sqrt $(x*x+y*y+z*z)$,
wherein Math·Sqrt is a function for computing a square root;
calculating eight features for each of the x, y and z spatial components and the component s to obtain 32 features, wherein the eight features are (1) a mean value, (2) a variance, (3) a mean absolute value, (4) energy=$\Sigma$Math·pow(x, 2)/n, where n is a number of pieces of sensing data collected within an extraction period, (5) a maximum value, (6) a minimum value, (7) a fast Fourier transformation (FFT) mean value, which is a mean value after FFT transformation is performed on the sensing data, and (8) an FFT weighted mean that is a weighted mean value after the FFT transformation is performed on the sensing data and the weighted values are $1/n, 2/n, \ldots, i/n, \ldots$ and $n/n$; and
storing the extracted feature data in the memory.

15. The method according to claim 1, wherein, the measured object is experiencing acceleration and the sensing data is acceleration data comprising the x, y and z spatial components.

* * * * *